US012807110B2

(12) United States Patent
Böhm et al.

(10) Patent No.: US 12,807,110 B2
(45) Date of Patent: Nov. 24, 2026

(54) METHOD FOR GENERATING A TARGET VALUE, METHOD FOR CONTROLLING AN ACTUATOR, AND CONTROLLER

(71) Applicant: Continental Automotive Technologies GmbH, Hannover (DE)

(72) Inventors: Jürgen Böhm, Oberneisen (DE); Sascha Gröger, Idstein (DE); Matthias Muntu, Hofheim am Taunus (DE)

(73) Assignee: AUMOVIO GERMANY GMBH, Frankfurt am Main (DE)

( * ) Notice: Subject to any disclaimer, the term of this patent is extended or adjusted under 35 U.S.C. 154(b) by 0 days.

(21) Appl. No.: 18/871,017

(22) PCT Filed: May 17, 2023

(86) PCT No.: PCT/DE2023/200103
§ 371 (c)(1),
(2) Date: Dec. 2, 2024

(87) PCT Pub. No.: WO2023/232203
PCT Pub. Date: Dec. 7, 2023

(65) Prior Publication Data

US 2025/0326384 A1 Oct. 23, 2025

(30) Foreign Application Priority Data

Jun. 2, 2022 (DE) ..................... 10 2022 205 632.9

(51) Int. Cl.

| | |
|---|---|
| ***B60T 8/58*** | (2006.01) |
| ***B60T 8/171*** | (2006.01) |
| ***B60T 8/172*** | (2006.01) |

(52) U.S. Cl.
CPC ................ *B60T 8/58* (2013.01); *B60T 8/171* (2013.01); *B60T 8/172* (2013.01); *B60T 2240/02* (2013.01); *B60T 2250/04* (2013.01)

(58) Field of Classification Search
CPC . B60T 8/58; B60T 8/171; B60T 8/172; B60T 2240/02; B60T 2250/04; B60T 13/66; B60T 8/176; B60Y 2400/81
See application file for complete search history.

(56) References Cited

U.S. PATENT DOCUMENTS

2003/0141759 A1* 7/2003 Erban ..................... B60T 8/172 303/155
2009/0115247 A1 5/2009 Leiber
(Continued)

FOREIGN PATENT DOCUMENTS

DE 19813194 A1 10/1999
DE 19926672 A1 3/2000
(Continued)

OTHER PUBLICATIONS

German Search Report dated Dec. 22, 2022 for the priority German Patent Application No. 10 2022 205 632.9.
(Continued)

*Primary Examiner* — Long T Tran
*Assistant Examiner* — Charles J Brauch
(74) *Attorney, Agent, or Firm* — Buchanan Ingersoll & Rooney P.C.

(57) ABSTRACT

A method for generating a target value of a position of an actuator of a brake of a wheel of a motor vehicle is disclosed. Values of another wheel are used and as a result a correction value which corrects a starting value is determined. As a result, a force sensor system on the wheel can be omitted. Further, an associated method for controlling an actuator of a brake of a wheel of a motor vehicle and an associated control device are disclosed.

15 Claims, 2 Drawing Sheets

(56) References Cited

U.S. PATENT DOCUMENTS

| | | | |
|---|---|---|---|
| 2013/0080016 | A1 | 3/2013 | Bohn |
| 2013/0304345 | A1 | 11/2013 | Bohm |
| 2014/0046514 | A1 | 2/2014 | Jennek |
| 2024/0042985 | A1 | 2/2024 | Bohm |

FOREIGN PATENT DOCUMENTS

| | | | |
|---|---|---|---|
| DE | 102012200494 | A1 | 8/2012 |
| DE | 102012200705 | A1 | 8/2012 |
| DE | 102021207447 | A1 | 1/2023 |
| JP | 2011213201 | A | 10/2011 |
| JP | 2021054175 | A | 4/2021 |
| KR | 20210153682 | A | 12/2021 |
| WO | 9903714 | A1 | 1/1999 |
| WO | 2010064526 | A1 | 6/2010 |

OTHER PUBLICATIONS

The International Search Report and the Written Opinion of the International Searching Authority mailed on Jul. 12, 2023 for the PCT Application No. PCT/DE2023/200103 which this application claims priority.

Notice of Reasons for Refusal mailed on Nov. 5, 2025 for the counterpart Japanese Patent Application No. 2024-562853 and machine translation of same.

Decision to Grant a Patent mailed on Feb. 18, 2026 for the counterpart Japanese Patent Application No. 2024-562853 and machine translation of same.

Office Action (Request for the Submission of an Opinion) issued Jun. 19, 2026, by the Korean Intellectual Property Office in corresponding Korean Patent Application No. 10-2024-7035599 and an English translation of the Office Action. (10 pages).

* cited by examiner

METHOD FOR GENERATING A TARGET VALUE, METHOD FOR CONTROLLING AN ACTUATOR, AND CONTROLLER

TECHNICAL FIELD

The embodiments relate to a method for generating a target value of a position of an actuator of a brake of a wheel of a motor vehicle. The embodiments also relate to an associated method for controlling an actuator and to an associated control device.

BACKGROUND

Wheel brakes are typically used in order to decelerate motor vehicles in a targeted manner. Until now, wheel brakes of this kind have been mostly driven hydraulically and, in the future, electrohydraulic or electromechanical electrical actuation is also envisaged. An actuator which can apply an actuating force is typically used to actuate a brake, regardless of the type of actuation. Depending on the position of said actuator, more or less braking is carried out or even no braking is carried out. For this reason, a suitable target value which corresponds to a desired braking effect is typically specified for the position.

SUMMARY

It is an object of to provide a method for generating a target value of a position of an actuator of a brake of a wheel of a motor vehicle. Further objects are to provide an associated method for controlling an actuator and an associated control device.

The embodiments relate to a method for generating a target value of a position of an actuator of a brake of a wheel of a motor vehicle.

The method comprises the following steps:

determination of a starting value based on a brake request, determination of a correction value based at least on a wheel speed of the wheel, a wheel speed of another wheel and a slip scaling factor, and correction of the starting value using the correction value.

Use of such a method can minimize the effort required to determine the target value. It is sufficient to determine two wheel speeds. The slip scaling factor may be variable or fixed, thus creating a relationship between the wheel and the other wheel. For example, control mechanisms of the other wheel can also take over some of the control tasks for the wheel, and this can be used, for example, to dispense with a force sensor on the wheel.

A motor vehicle has, for example, four wheels, especially if it is a passenger car or a light commercial vehicle. The method may be used for such vehicles, but may also be used for other vehicles, for example for single-track motor vehicles with typically only two wheels, or for vehicles with more than four wheels. The decisive factor is the presence of a wheel for whose brake actuator a target value as described herein is to be determined, and the presence of another wheel for which a wheel speed is known.

The starting value can be corrected, for example, in such a way that the starting value is corrected by the correction value, for example by addition, subtraction or other computational operations, wherein the value which arises when correcting the starting value by means of the correction value is typically the target value. This target value can then be used for brake control.

The correction value can also be determined based on a vehicle speed of the motor vehicle. This may mean, for example, that the correction value is included in the described calculation or any other calculation. For example, the vehicle speed can be used to calculate a wheel speed target value which can also be included in the determination of the correction value.

For example, a target wheel speed for the wheel at which the wheel has a slip which scales a slip of the other wheel and corresponds to the slip scaling factor can be calculated in order to calculate the correction value. This enables the slip scaling factor to be used to specify how the wheel speed of the wheel should behave when braking compared to that of the other wheel. The correction value can be determined accordingly.

The correction value can be determined, for example, based on a difference between the target wheel speed and an actual wheel speed. As a result, such a difference can result in the correction value attempting to compensate for this difference. For example, the correction value can be calculated in such a way that it minimizes this difference in terms of magnitude or brings it to zero.

The target wheel speed can be calculated, for example as follows, in the presence of a value for the vehicle speed:

$$(1-\text{slip scaling factor})\times\text{vehicle speed}+\text{slip scaling factor}\times\text{wheel speed of the other wheel}.$$

This has been a proven way to calculate a target wheel speed, where the target wheel speed results in the wheel having the desired slip or a desired relationship with respect to the slip compared to the other wheel.

The target wheel speed can be calculated as follows in the absence of a value for the vehicle speed:

$$\text{slip scaling factor}\times\text{wheel speed of the other wheel}+\text{offset}.$$

The method can be applied even in the event that there is no value present for the vehicle speed, for example because it is not possible to calculate it in a reasonable manner. For example, the offset can be selected appropriately so that it results in the desired effect over the largest possible operating range.

For example, the correction value can be reduced to zero based on its current value after it can no longer be determined. This may be a reaction to the fact that a value for the correction value can no longer be determined, for example because one or more of the items of data necessary for this is or are no longer available. The data that are no longer available may be, for example, the vehicle speed or a rotational wheel speed of the other wheel. Reducing to zero prevents the correction value from making unwanted interventions in a braking operation that have nothing to do with the current situation. For example, the aforementioned reduction procedure can be used in a wheel-specific brake intervention, for example if the other wheel is to be braked significantly differently to the wheel.

Reduction can be performed, for example, linearly or in accordance with a predetermined ramp. Such a linear reduction or ramp can be specified, for example, as a function over time. This enables the correction value to be brought to a value of zero steadily, which prevents abrupt changes in braking behavior and resulting safety or comfort problems.

For example, an actuating force on the other wheel can be controlled, inter alia, based on a measured value of the actuating force on the other wheel. The actuating force on the other wheel can in this case be measured, for example, by means of a force sensor.

The actuating force may be, for example, a clamping force if the brake is a disk brake and may be, for example, a spreading force if the brake is a drum brake. A measured value of the actuating force on the wheel is not used. It is thus possible to dispense with the acquisition of such a measured value and associated sensors. The brake which is controlled by means of the method described herein thus does not have an actuating force sensor and/or any other force sensor.

During correction, for example, the correction value can be added to the starting value or subtracted from the starting value. This corresponds to a simple procedure. Other calculation rules are also possible in principle.

For example, the starting value can be determined from the brake request using a predefined table or function. The brake request in this case typically specifies a value which correlates to a desired braking effect. The starting value can then be determined using a table or a function. The table or the function may be based, for example, on measurements and/or calculations. In the case of a table, a specific starting value can be stored, for example for multiple discrete values of the brake request. A function can be formulated, for example, as a mathematical formula.

The starting value can be set to a predefined standby value, especially in the absence of a brake request. For example, this may be a standby value that ensures no braking effect is produced.

According to one embodiment, after a correction value or multiple correction values have been determined, a scaling factor is calculated based on at least one correction value and at least one starting value. The table or function can be scaled, for example, using the scaling factor. This enables the table or function to be scaled after a correction value has been determined, such that the necessary correction is reduced by the correction value in subsequent brake requests. For example, the scaling factor can in this case be calculated in such a way that the sum of the starting value and the correction value is equal to the product of the scaling factor and the starting value. However, other calculation rules can also be used.

For example, the wheel and the other wheel can be associated with different axles. This means that force sensors can be dispensed with, for example for an axle, for example the rear axle. The wheel may be, for example, a rear wheel and the other wheel may be, for example, a front wheel. However, other embodiments, for example the reverse embodiment, are also possible. For example, the wheel and the other wheel can be on the same side. For example, this may mean that both wheels, that is to say the wheel and the other wheel, are on the same side of a multi-track motor vehicle, for example on the left or on the right side.

The actuator may be, for example, an electromechanical actuator. An actuator of this kind is typically driven directly by an electric motor which is typically arranged close to the wheel. For example, the actuator may be a brake actuator. However, the method can also be used for hydraulic or electrohydraulic brakes or else combinations. In this case, for example, a pressure can be measured on an axle which generates a wheel speed target value for the other axle or brake. A brake which is controlled by means of the method described herein is typically of electromechanical or electrohydraulic design. Another brake which is typically assigned to the other wheel may also be an electromechanical or electrohydraulic brake or it may be, for example, a hydraulic brake.

The embodiments further relate to a method for controlling an actuator of a brake of a wheel of a motor vehicle. The method comprises the following steps:

- generation of a target value of a position of the actuator by means of a method as described herein, wherein, with regard to the method, reference can be made to all of the embodiments and variants described,
- determination of a difference by subtracting an actual value of the position of the actuator from the target value, and
- determination of a target rotational speed of the actuator based on the difference.

For example, a position controller function associated with the method described herein can be implemented as a result. The target value can already be seen here, including the correction using the correction value. The actual value of the position of the actuator can be determined, for example, based on a measurement, for example by means of a position sensor or an angle sensor.

A control device for a brake of a wheel of a motor vehicle is also disclosed. The control device is configured for carrying out a method as described herein. With regard to the method, reference can be made to all of the embodiments and variants described herein. For example, the control device may comprise storage means and processor means, wherein the storage means contain program code, upon execution of which the processor means carry out a method according to the invention. The embodiments furthermore relate to a non-volatile, computer-readable storage medium on which program code is stored, during the execution of which a processor executes a method according to the invention. With regard to the method, reference can be made to all of the embodiments and variants described herein.

For example, the method described herein can be used for a power brake system in which the brake pedal is decoupled from the brake system and the wheel brakes are implemented, for example, by electromechanically actuated brakes. These brakes may be both disk brakes and drum brakes. Electromechanical disk brakes may be designed in such a way that a brake application force is produced by means of an electric motor, a front-mounted gear mechanism and a rotary/translation gear mechanism. The brake application force, that is to say the force with which the brake pads are pressed against the brake disk, then produces a corresponding braking torque at the wheel in question. Depending on the embodiment and control concept, the control process may be such that either a predetermined, defined clamping force or a predetermined, defined braking torque is set in accordance with the deceleration demand requested.

An electromechanically actuated drum brake may be designed so that a motor/transmission unit actuates an expansion module which presses the brake linings against the brake drum with an expansion force determined on the basis of the desired deceleration requested and thus produces a corresponding braking torque. In this case, too, depending on the embodiment and control concept, the control process may be designed such that a defined expansion force or a braking torque is set in accordance with the deceleration demand requested.

Also considered are arrangements of combinations of hydraulic and electromechanical actuators, wherein the electromechanical brake actuators are then arranged on the rear axle.

To set the required brake application forces or spreading forces or braking torques with a correspondingly required degree of accuracy, complex force sensors or braking torque sensors are sometimes used for each brake actuator. These can be omitted using the method described in this document.

BRIEF DESCRIPTION OF THE DRAWINGS

A person skilled in the art will gather further features from the exemplary embodiment described below with reference to the appended drawing. In the drawings.

DETAILED DESCRIPTION

Figure 1:
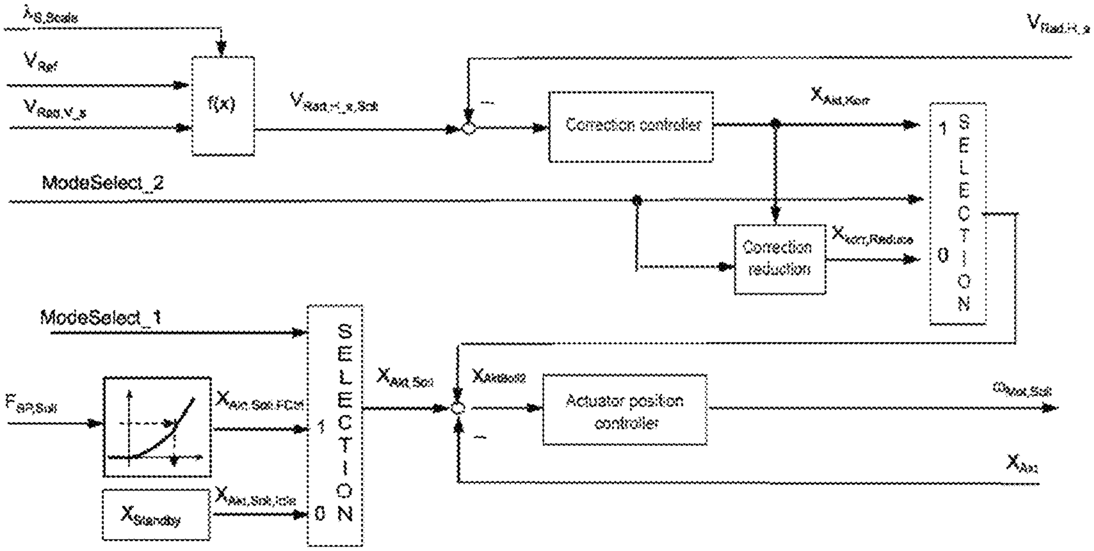
FIG. 1 shows a block diagram.
Figure 3:
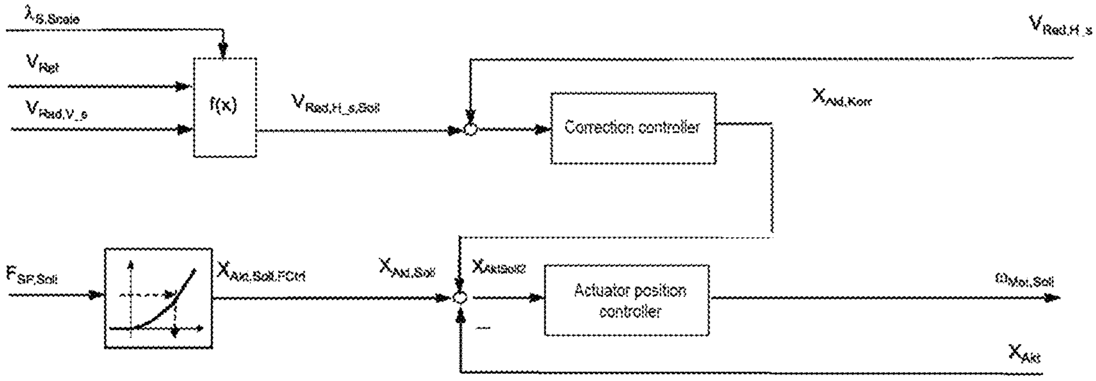
FIG. 3 shows a further block diagram.

FIG. 1 shows a block diagram of a method according to an exemplary embodiment. FIG. 1 shows an overall view, where FIG. 3 shows a corresponding arrangement for the case that the method is activated.

It is generally assumed that electromechanical wheel brakes of a first axle, in this case the front wheel axle, are operated in a known manner, that is to say are controlled, for example, by means of a force sensor or a similar device. In this case, the corresponding brake application force, spreading force or braking torque is determined and adjusted or controlled by means of specific force or torque sensors according to the required deceleration request. The block diagram illustrated in FIG. 1 shows the overall arrangement for an electric brake actuator of a second axle, in this case the rear wheel axle, in which, for example, a motor speed control system which is not illustrated in FIG. 1 and which produces a motor speed target value or a target rotational speed of the actuator $\omega_{Mot,Soll}$ as the target value and a motor target torque $M_{Akt,Soll}$ as manipulated variable for the actuator is subordinate to an actuator control system. It is essential in the arrangement shown that a controller structure in which the use of clamping force sensors or brake torque sensors is dispensed with is used.

Figure 2:
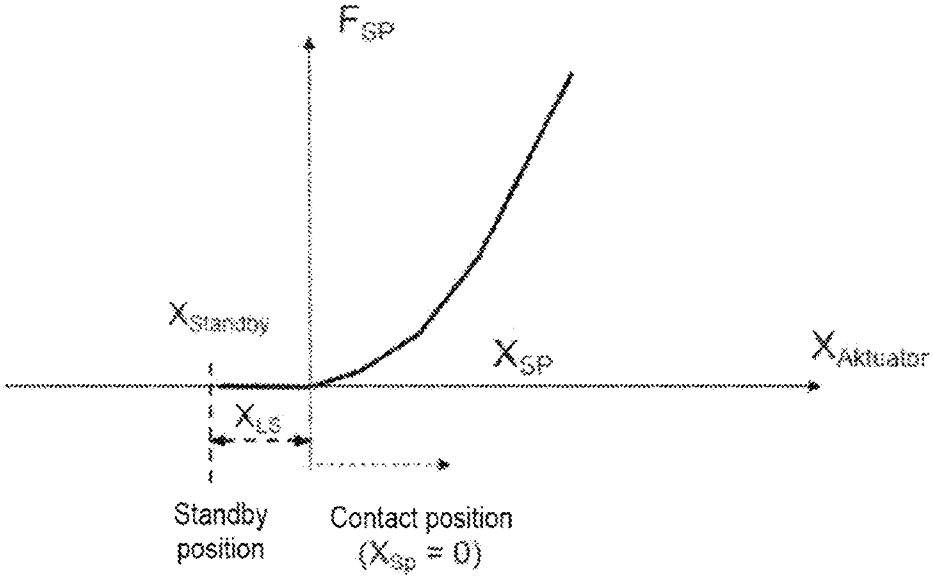
FIG. 2 shows a graph of a function.

In FIG. 2, for example for a better understanding of further consideration, the definition of the coordinate system under consideration here and the relationship between the brake application force or actuating force $F_{SP}$ and brake application travel $X_{SP}$ of the actuator is illustrated in the form of a characteristic curve, wherein, as an alternative to the brake application travel $X_{SP}$ (translational movement), a motor angle $\varphi_{Akt}$ or $\varphi_{SP}$ (rotational view) can also be considered. Both variables are clearly linked to one another, for example by a transmission gear of the electromechanical drive train. A contact position $X_{SP}=0$ is determined, for example, during an initialization routine and is continuously corrected, even when the brake is actuated. Since no clamping force sensors are available, the determination of the contact detection is based, for example, on the consideration of the motor torque and takes into account the fact that the motor torque $M_{Akt}$ also increases as a result of the increase in force during the transition from free movement (driving in release clearance) to non-positive movement (application of the brake).

The basic idea of the arrangement illustrated in FIG. 1 is that the electromechanical brake is operated in a clamping force or spreading force control process and that the target value for the actuator position, determined from the force or braking torque target value and the relationship between the requested force and the corresponding position, is corrected by means of a wheel speed control process. In the further embodiments, the case of electromechanically actuated disk brakes, in which a deceleration request is converted into a brake application force to be applied, is considered here as an example. Transfer to electrically operated drum brakes is easily possible. It is also assumed that the first axle is the front axle and the second axle is the rear axle.

If there a deceleration request, that is to say a request for applying a defined brake application force or a defined braking torque in the form of a brake request $F_{SP,Soll}$, the actuator is moved in the brake application direction from its rest position (idle position/standby position; see FIG. 2) in the direction of brake application. If there is no request or if an existing brake application request is reset again (target value=0), the actuator is transferred or held in an unactuated state in which a defined distance from brake pad to brake disk (release clearance) is set and maintained by the actuator so that there is no residual braking torque. In this case, in accordance with the arrangement according to FIG. 1, a selection parameter ModeSelect_1 is defined so that the actuator position sets the target position $X_{Akt,Soll,Idle}$ (ModeSelect_1=0). In this case, $X_{Akt,Soll}=X_{Akt,Soll,Ilde}=X_{Standby}$ thus holds true. In the event of a deceleration request, ModeSelect_1 is defined in such a way that the starting value $X_{Akt,Soll}=X_{Akt,Soll,FCtrl}$ is determined for the actuator position controller (ModeSelect_1=1).

It is now proposed, according to this exemplary embodiment, during braking, to relate the braking forces of the first force-controlled or braking-torque-controlled axle to the braking forces of the second axle. This is done by means of rotational wheel speeds or wheel speeds. During braking, the wheel speed controller is activated as a correction controller for correcting $X_{Akt,Soll}$ by appropriately setting a selection parameter ModeSelect_2 (ModeSelect_2=1), for example when the function described herein is activated.

The target value for the wheel speed $V_{Rad,H\_s,Soll}$ (with s=L for left or R for right) or rotational wheel speed $\omega_{Rad,H\_s,Soll}$ results from the wheel speed $V_{Rad,V\_s}$ or the rotational wheel speed $\omega_{Rad,V\_s}$ of the wheel of the front wheel axle on the same side ($v_{Rad}=R_{dyn}\times\omega_{Rad}$; the wheel speed is considered as an example in the following text). It is proposed that this target value $V_{Rad,H\_s,Soll}$ be determined for the wheel speed in such a way that a defined ratio between the wheel slip $S_{V\_s}$ of the (force-controlled) electromechanical brake of the front wheel axle and the (force-controlled) electromechanical brake of the rear wheel axle on the same side is established. The following therefore applies:

$$S_{H\_s,Soll}=\lambda_{S,Scale}\times S_{V\_s}$$

or $$S_{H\_s,Soll}=\lambda_{S,Scale}\times\big((V_{Ref}-V_{Rad,V\_s})/V_{Ref}\big).$$

S in this case basically refers to a slip. V denotes the wheel speed, index V indicates the front, H indicates the rear.

The parameter $\lambda_{S,Scale}$ where $0<\lambda_{S,Scale}<1$ represents, in particular, the required ratio between the slip of the front wheel and the slip of the rear wheel on the same side and can be specified from the point of view of driving dynamics and from the point of view of driving stability and, if necessary, adapted to the respective driving situation. This involves, for example, the slip scaling factor already mentioned above. The resulting target value for the wheel speed then results in:

$$V_{Rad,H\_s,Soll}=(1-\lambda_{S,Scale})\times V_{Ref}+\lambda_{S,Scale}\times V_{Rad,V\_s}.$$

Alternatively, or in the event that no or no valid vehicle reference speed or vehicle speed $V_{Ref}$ is available, the target value can also be calculated as follows:

$$V_{Rad,H\_s,Soll}=\lambda_{S,Scale}\times V_{Rad,V\_s}+v_{Rad,Offset}.$$

Here, too, a defined ratio between the rotational wheel speed of the front wheel and the rotational wheel speed of the rear wheel on the same side can be set through appropriate definition of the parameters. For example, an offset $V_{Rad,Offset}$ can be specified for this purpose.

The parameters described here for forming the target value for the wheel speed can also be changed dynamically during control of the wheel brake. This then takes place, for example, depending on the requirement of the function requiring braking.

The correction controller illustrated in FIG. 1 and FIG. 3 produces a correction value $X_{Akt,Korr}$ for the actuator position target value and starting value $X_{Akt,Soll,FCtrl}$, respectively, based on the deviation between the target value and the actual value of the wheel speed. For example, this value is additively superimposed by the target value $X_{Akt,Soll,FCtrl}$ and thus brings about a correction of inaccuracies or changes in the model for the relationship $X_{Akt}=f(F_{SP})$. The result is a target value $X_{Akt,Soll2}$ which represents an input variable for an actuator position controller. A linear controller with proportional-integral (PI) behavior is used as the structure for the correction controller. In principle however, other controllers can also be used. A differentiating component in the controller (PID) can also be added to increase the actuating dynamics in the event of rapid changes in the target value or actual value. In another embodiment (not shown here), the manipulated variable of the correction controller $X_{Akt,Korr}$ can still be limited to minimum and maximum permissible values.

If there is a request for wheel-specific brake interventions which are not able or only with difficulty are able to be represented by means of the function f(X) shown in FIG. 1 and described here, or if the wheel speed signal is in the range of low speeds or close to standstill, where the signal quality is not sufficient for finely meterable brake actuation due to the limited resolution, the correction controller is deactivated by setting ModeSelect_2=0, so that only the force control remains active. The correction actuator position $X_{Akt,Korr}$ requested at the time of deactivation is ensured ($X_{Akt,Korr}$,null) and reduced to a value of zero during further actuation of the wheel brake depending on the actuator position $X_{Akt}$. For this purpose, when the correction controller is deactivated, the actuator position present at this point in time is typically also stored ($X_{Akt,null}$). The correction reduction function illustrated in FIG. 1 is activated and reduces the correction position $X_{Akt,Korr}$ so far when values for $X_{Akt}$ become smaller that the correction position or the correction value $X_{Akt,Korr}$ is also reduced to the value zero until the actuator position $X_{Akt}=0$ is reached. This is illustrated in FIG. 1 by a reduced correction value $X_{Akt,Korr,Reduce}$.

The basic characteristic curve illustrated in FIG. 2 can be adjusted using the correction values $X_{Akt,Korr}$ that were determined by the correction controller during braking. A characteristic curve correction parameter $K_k$ which can also be referred to as a scaling factor and which can be determined based on the correction values is used for this purpose. The following then applies:

$$X_{Akt,Soll,FCtrl}+X_{Akt,Korr}=K_k\times X_{Akt,Soll,FCtrl}.$$

If a defined minimum value for the target position of the actuator $X_{Akt,Soll,FCtrl,min}>0$ is considered, then the following applies:

$$K_k=(X_{Akt,Soll,FCtrl}+X_{Akt,Korr})/X_{Akt,Soll,FCtrl}.$$

According to this equation, the characteristic curve correction parameter $K_k$ can be determined as described above in each controller loop during actuation of an electromechanical brake and with the correction controller activated (ModeSelect_1=1). The value determined in this way is for example filtered again to smooth out fluctuations and interference excitation. Filters which may be used are those which have a diminishing memory or only a limited memory. The simplest form of such a filter with a limited memory represents the determination of a sliding mean value from the last n previous values. The value $K_{k,Filt}$ is then obtained. The calculation of the new characteristic curve correction value is carried out after braking has been completed if there is no deceleration request and the actuator position is in the release clearance. In this case, Mode Select_1=0, and $X_{Akt,Soll}=X_{Akt,Soll,Idle}=X_{Standby}$ then applies to the requested actuator position.

The model or characteristic curve $F_{SP}=f(X_{Akt})$ is then adapted, for example, if the determined correction value $K_{k,Filt}$ deviates by a specific value of 1.0, for example if $Abs(1.0-K_{k,Filt})>\varepsilon$ applies, where ε represents a threshold value. If this is the case, the supporting points $X_{Akt,i}$ of the characteristic curve $F_{SP}=f(X_{Akt})$ or the model parameters which depend on the position are updated for example. If the characteristic curve is mapped using a number of interfaces, the following applies:

$$X_{Akt,i}=K_{k,Korrektur}\times X_{Akt,i}.$$

The index i here means the i-th interface of the characteristic curve i=1 . . . n).

In the embodiment shown, it is proposed to determine the correction parameter $K_{k,Korrektur}$ from $K_{k,Filt}$ via the relationship illustrated below:

$$K_{k,Korrektur}=\alpha\times K_{k,Filt}+(1-\alpha)\times 1.0.$$

The parameter α (0<α<1) in this case determines the extent to which correction values determined during braking are taken into account, where it holds true that for α=0 there is no correction and for α=1 the specified value for $K_{k,Filt}$ is adopted at 100%. When defining α, a compromise can be found here, for example, between great adaptation dynamics and sufficiently good filtering and stability of the model.

Mentioned steps of the method can be executed in the specified order. However, they can also be executed in a different order, if technically feasible. The method can be executed in one of its embodiments, for example with a specific set of steps, in such a way that no further steps are executed. However, further steps can also be executed in principle, even those that are not mentioned.

It is pointed out that features may be described in combination in the claims and in the description, for example in order to facilitate understanding, even though these can also be used separately from one another. A person skilled in the art will recognize that such features may also, independently of one another, be combined with other features or combinations of features.

Dependency references in dependent claims may characterize combinations of the respective features but do not exclude other combinations of features.

The invention claimed is:

1. A method for generating a target value of a position of an actuator of a brake of a wheel of a motor vehicle comprising:

determining a starting value based on a brake request, determining a correction value based at least on a wheel speed of the wheel, a wheel speed of another wheel and a slip scaling factor, correcting the starting value using the correction value, and providing the target value to an actuation position controller of the actuator.

2. The method as claimed in claim 1, wherein the correction value is also determined based on a vehicle speed of the motor vehicle.

3. The method as claimed in claim 1, further comprising calculating a target wheel speed for the wheel at which the wheel has a slip corresponding to a slip of the other wheel scaled by the slip scaling factor in order to calculate the correction value.

4. The method as claimed in claim 3, wherein the correction value is determined based on a difference between the target wheel speed and an actual wheel speed.

5. The method as claimed in claim 3, wherein the target wheel speed is calculated as follows in the presence of a value for the vehicle speed: (1−slip scaling factor)*vehicle speed+slip scaling factor*wheel speed of the other wheel.

6. The method as claimed in claim 3, wherein the target wheel speed is calculated as follows in the absence of a value for the vehicle speed: slip scaling factor*wheel speed of the other wheel+offset.

7. The method as claimed in claim 1, wherein the correction value is reduced to zero based on its current value after it can no longer be determined.

8. The method as claimed in claim 7, wherein the reduction is carried out linearly or in accordance with a predetermined ramp.

9. The method as claimed in claim 1, wherein an actuating force on the other wheel is controlled based on at least one of: a measured value of the actuating force on the other wheel, and a measured value of the actuating force on the wheel is not used.

10. The method as claimed in claim 1, wherein, the correction value is one of added to the starting value and subtracted from the starting value during correction.

11. The method as claimed in claim 1, wherein the starting value is at least one of determined from the brake request using a predefined table or function, and is set to a predefined standby value in the absence of a brake request.

12. The method as claimed in claim 11, wherein, after a correction value or multiple correction values have been determined, a scaling factor is calculated based on at least one correction value and at least one starting value, and the table or function is scaled using the scaling factor.

13. The method as claimed in claim 1, wherein at least one of the wheel and the other wheel are associated with different axles, the wheel is a rear wheel and the other wheel is a front wheel, and wherein the wheel and the other wheel are on the same side.

14. A method for controlling an actuator of a brake of a wheel of a motor vehicle, wherein the method comprising:

generating a target value of a position of the actuator by:

determining a starting value based on a brake request, determining a correction value based at least on a wheel speed of the wheel, a wheel speed of another wheel and a slip scaling factor, and correcting the starting value using the correction value, determining a difference by subtracting an actual value of the position of the actuator from the target value, and determining a target rotational speed of the actuator based on the difference.

15. A control device for a brake of a wheel of a motor vehicle, wherein the control device is configured for carrying instructions for:

determining a starting value based on a brake request, determining a correction value based at least on a wheel speed of the wheel, a wheel speed of another wheel and a slip scaling factor, and correcting the starting value using the correction value, and providing the corrected starting value to an actuation position controller of the brake of the motor vehicle.

* * * * *